United States Patent [19]
Schwarz

[11] 3,828,870
[45] Aug. 13, 1974

[54] SCALE
[75] Inventor: Josef Schwarz, Balingen/Wurtt, Germany
[73] Assignee: Bizerba-Werke Wilhelm Kraut KG, Balingen/Wurtt, Germany
[22] Filed: Aug. 24, 1973
[21] Appl. No.: 391,290

[30] Foreign Application Priority Data
Aug. 30, 1972 Germany.............................. 2242570

[52] U.S. Cl. ............................................... 177/155
[51] Int. Cl. ............................................ G01g 23/02
[58] Field of Search ............................ 177/154–157

[56] References Cited
UNITED STATES PATENTS
719,904  2/1903  Taylor et al. .................... 177/155 X Primary Examiner—George H. Miller, Jr.
Attorney, Agent, or Firm—Michael S. Striker

[57] ABSTRACT

A scale has a housing and an indicating mechanism in the housing, and a weighing platform outside the housing. A movable balance arm connects the platform with the mechanism. The platform is removably connected with the arm so that it can be taken off the same. An arresting arrangement is provided for the arm and is so arranged in the interior of the housing that it can engage the arm or be disengaged from the same, only when the platform is removed from the arm.

4 Claims, 3 Drawing Figures

3,828,870

SCALE

BACKGROUND OF THE INVENTION

The present invention relates generally to scales, and more particularly to a scale having an arresting arrangement.

Many types of scales are provided with arresting arrangements, that is arrangements which arrest the weighing mechanism or balance mechanism against movement. The primary reason for providing such arresting arrangements is to permit the balance mechanism to be rendered inoperative, and to remove any forces acting upon the pivots of the balance mechanism, during transportation or shifting of the scale, in order to prevent damage to these delicate components.

A simple arresting arrangement known from the prior art for the aforementioned purpose uses clamping screws or set screws each of which is associated with one of the components to be arrested. These screws are then tightened against the respective component, when it is desired to arrest the same. It is also known from the prior art to use individual underlayments which are placed in contact with the components to be arrested, to frictionally retain them against movement. Where scales to be sent in specially constructed packages, it is known to so construct the package that it will at least in part support the scale in such a manner that the movement of the balance mechanism is prevented.

There are many instances where these various proposals of the prior art are not suitable, for instance if the scale is to be arrested (and if the arresting is subsequently to be released) by persons who have no particular skill in dealing with such mechanisms. It is therefore also proposed in the prior art to provide an arresting arrangement by which a central arresting lever, which is usually located beneath the scale, is displaced through 180° and arrests the entire mechanism at once, that is the single displacement of the lever arrests all components of the balance mechanism. This lever performs certain different functions sequentially and in a certain sequence, as it is moved from its disengaged to its engaged or arresting position. For instance, in a first phase of the movement the weight-supporting platform of the scale and the levers associated therewith may be moved to a position in which the levers are urged against respective abutments. If the scale has only so-called un-dampened levers, then the various levers can be fixed in arrested position in a second phase of the movement of the arresting lever. Usually, the respective levers are lifted out of their pivot supports until they move into engagement with an abutment provided for the arresting purposes. It is particularly important in these arrangements that intermediate positions of the arresting lever are not possible because this might permit tampering and manipulations during the weighing operation, by moving the arresting lever to a position in which the weighing levers of the scale are not yet in arresting position, but are sufficiently influenced to provide falsified weighing results.

In all known prior-art constructions the weight-supporting platform of the scale continues to rest on and be supported by the levers of the balance mechanism, so that external forces can be transmitted to these levers and also to the arresting device, via the weight support. This can, of course, lead to damage of the various components. Since this possibility is not acceptable, the industry has found it necessary to make the components in question much stronger than their inherent use would require, namely so strong that they cannot be damaged even in the event that the aforementioned external forces act upon them. The result of all this is that the prior-art constructions of scales having an arresting arrangement are rather complicated and, not surprisingly, correspondingly expensive.

SUMMARY OF THE INVENTION

It is, accordingly, a general object of the present invention to overcome the aforementioned disadvantages of the prior art.

More particularly, it is an object of the present invention to provide an improved scale having an arresting arrangement which avoids the aforementioned disadvantages.

Another object of the invention is to provide such an improved scale which is relatively uncomplicated and therefore less expensive than what is known from the art.

In keeping with these objects, and with others which will become apparent hereafter, one feature of the invention resides in a scale, and more particularly to a combination comprising a housing, an indicating mechanism in the housing, and a weighing platform outside the housing. A movable balance arm connects the platform with the mechanism, and the platform is removably connected with the arm. Arresting means is provided for the arm and is so arranged in the housing as to be operable for engaging and disengaging the arm only when the platform is removed from the same. Thus, the arresting means can be operated only when the platform has been removed from the balance arm, with the result that when the arresting means is in the operated position, no forces can be transmitted to it exteriorly via the platform. On the other hand, the fact that the arresting means can be operated only when the platform is removed, it is impossible for illegal manipulations of the weighing results to be carried out with the aid of the arresting means.

According to a further and currently preferred concept of the invention, the platform may be put back in place after the arresting means has been used to arrest the balance arm, but in that case the platform will then be disconnected from the balance arm and will be supported on the scale housing, either directly or indirectly. It will continue to be so supported until the arresting means has been operated again to release the balance arm, whereupon the platform can be reconnected with the same and the scale can be put in use.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
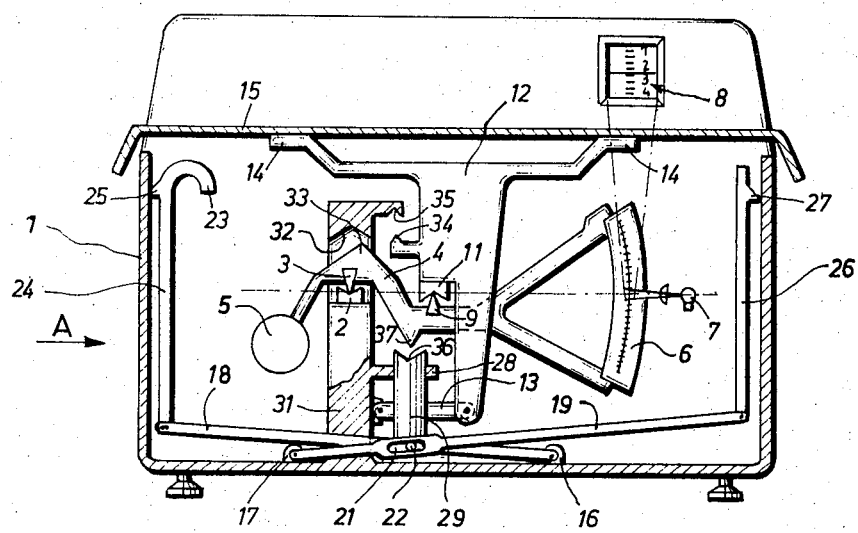
FIG. 1 is a vertical section through a scale according to the present invention, showing the arresting device of the scale in its rest position.
Figure 2:
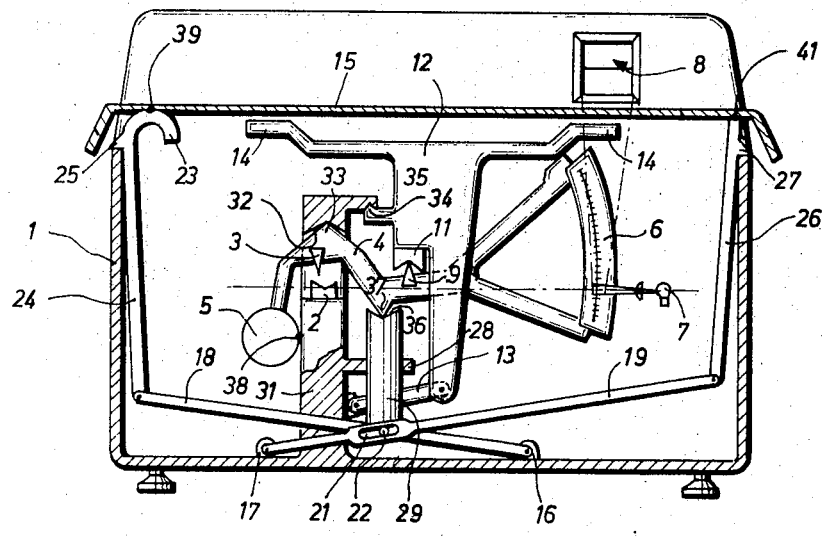
FIG. 2 is a view similar to FIG. 1, showing the scale of FIG. 1 with the arresting device in arresting position.
Figure 3:
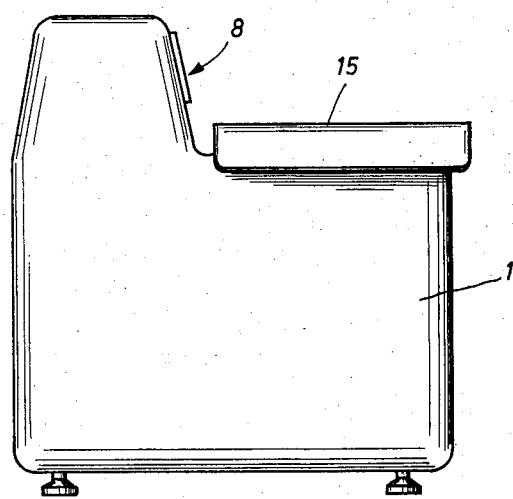
FIG. 3 is a side view of the scale as seen in the direction of the arrow A in FIG. 1.

Discussing the drawing in detail, it will be seen that in FIGS. 1–3 there is illustrated a scale having a housing 1. A seat 2 is provided in the housing 1, and an arm 4 is pivotally supported in the seat 2 by means of a knife edge 3. At one end the arm 4 carries a weight 5 and at the other end an indicating scale 6 which can be projected, i.e., whose indications can be projected onto a screen 8 provided on the housing 1, by means of a light source 7 and known optical components, such as lenses, mirrors and the like. These optical components require no discussion herein, because they are well known per se to those skilled in the art and do not in themselves form a part of the invention.

The portion of the arm 4 which carries the scale 6 has supported on it, by means of a knife edge 9 and a seat 11, a load carrier 12 which is guided for parallel movement by a guide element 13. The carrier 12 is provided with laterally extending arms which support the actual plate or platform 15 onto which the load to be weighed is placed. The weight of the load is therefore transmitted to the platform 15 and via the same to the carrier 12, from there to the arm 4 which pivots in accordance with the magnitude of the weight, whereupon the weight of the load is indicated upon the screen 8.

An arm 18 is pivotally journalled in the seat 16, and similar arm 19 is pivotally journalled in the seat 17, both of these seats being provided on the housing 1. The arms 18 and 19 are coupled together with a pin 22 which is rigidly connected with one of the arms, here the arm 18 and which slides in a slot 21 of the arm 19. Because of this connection the arms 18 and 19 will perform movements in essential unison, that is when the arm 18 is pivoted the arm 19 must necessarily follow it. At the free end of the arm 18 there is provided an operating member in form of a pull rod 24 provided with a handle 23. The rod 24 is provided with a projection 25. A corresponding member 26 with a projection 27 is articulated to the free end of the arm 19. A member 29 is vertically shiftable in a guide 28 which is mounted on the housing; when the arms 18 and 19 are pivoted, the member 29 is displaced by these arms in upward or downward direction. A stationary support 31, which carries the seat 2, is provided in the interior of the housing 1 and formed with a kerf 32, and the arm 4 is provided with a projection 33 which is normally located below the kerf 32. A projection 34 extends laterally from the load carrier 12 and normally engages is spaced from the support 31 and located below a kerf 35 provided therein.

FIG. 1 shows the scale in operative position, that is ready for weighing. If the scale is to be arrested, that is to be placed from the condition shown in FIG. 1 into the arrested condition shown in FIG. 2, it is first necessary to remove the platform 15 in order to make the interior of the housing 1 accessible. Now, the person attempting to arrest the scale can engage the handle 23 and exert an upward pull, whereupon the projections 25 and 27 of the components 24 and 26 will engage the upper edge of the housing, as shown in FIG. 2. The levers 18 and 19 are pivoted upwardly and displace the component 29 in the same direction. A kerf 36 of the component 29 engages a projection 37 of the arm 4 and pivots the same until the weight 5 abuts the support 31 at the location 38, as shown in FIG. 2. When the component 29 is now further displaced in upward direction, it causes the arm 4 to be lifted off the seat 2, and results in its projection 33 being pressed into the kerf 32 where it is fixed, so that the arm is arrested, in conjunction with the fact that at the same time the projection 34 of the load support 12 is pressed into the kerf 35. The arm 4 and the load support 12 are now arrested, and the platform 15 can be put back in place. However, because the components 24 and 26 have been moved to the upwardly displaced position, the platform 15 is now no longer supported on the load carrier 12, but instead it engages the components 24 and 26 at the locations 39 and 41, respectively, so that the platform 15 is now supported stationarily (indirectly on the housing) and is entirely separated from the lever arrangement of the scale.

When the scale is to be returned to operative position, the load-supporting platform 15 is lifted off, the components 24 and 26 are disengaged from their connection with the housing 1 and now all components of the arresting device return automatically to their rest position shown in FIG. 1, and it should be noted that this takes place without any fixed intermediate positions which would permit a manipulation of the weighing results indicated by the scale. The arm 4 and the load carrier 12 return to their positions shown in FIG. 1 and the scale is ready for use as soon as the platform is placed back onto the load carrier 12.

It will be appreciated that with the scale according to the present invention, the disadvantages of the prior art are overcome. In the first place, the scale cannot be arrested until the platform 15 has been removed, which means that before the scale can be arrested, it will be in the below-zero position and no stresses can be transmitted to the scale mechanism in the arrested position. Moreover, the actuating component 24 for the arresting arrangement becomes accessible only after the platform 15 has been removed so that the scale cannot be used for weighing at this time. In arresting position, the platform 15 can be put back in place, for storage or transportation, but it is not in contact with any sensitive components of the scale, because it is supported on the housing via the components 24 and 26. This means that any external forces acting upon the platform 15, for instance during transportation or the like, are transmitted to the housing 1 and cannot act upon the system of levers or the components of the arresting device which are delicate and might be damaged by such forces. This means that, in particular, the arresting device can be readily so constructed, as has been illustrated, that the individual arresting elements are either in arresting position or in rest position, thus making it impossible to use the arresting device for setting of intermediate positions in which it might be employed as an aid in tampering with the accuracy of the scale.

It will be understood that each of the elements described above, or two or more together, may also find a useful application in other types of constructions differing from the type described above.

While the invention has been illustrated and described as embodied in a scale with an arresting arrangement it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims.

1. In a scale for use in shops, a combination comprising a housing provided with at least one detent; a weighing mechanism in said housing and including a load carrier, an indicating mechanism and a balance arm connecting said load carrier with said indicating mechanism and movable between a plurality of operating positions and an arresting position; arresting means including at least one arresting member adapted to engage said detent and said balance arm for arresting the latter in said arresting position thereof; and a removable platform outside said housing and removably supported on said load carrier when said balance arm is in one of said operating positions and removably supported on said arresting member when said balance arm is in said arresting position, said arresting means being accessible for engaging and disengaging said balance arm only when said platform is removed from said housing.

2. A combination as defined in claim 1, wherein said arresting means comprise a rod linkage, and a plurality of detents in said housing with which said linkage is engageable when said arm is arrested; and wherein said platform contacts and is supported by said linkage when the latter is in engagement with said detents.

3. A combination as defined in claim 1, wherein said arresting means comprises arresting members which are movable to and engageable with said housing in a position in which they arrest said arm, and which are movable to a rest position in automatic response to disengagement from said housing.

4. In a scale for use in shops, a combination comprising a housing having an open upper portion bounded by an upper edge; a weighing mechanism in said housing and including a load carrier, an indicating mechanism and a balance arm connecting said load carrier with said indicating mechanism and movable between a plurality of operating positions and an arresting position; arresting means including at least one arresting member connected to said balance arm when the latter is in said arresting position thereof and provided with a projection engaging said upper edge of said housing to thereby arrest said balance arm in said arresting position; and a removable platform outside said housing and removably supported on said load carrier when said balance arm is in one of said operating positions and removably supported on said arresting member when said balance arm is in said arresting position and obstructing access to said arresting member as long as said platform is so supported.

* * * * *